United States Patent
Watanabe et al.

(10) Patent No.: US 10,598,691 B2
(45) Date of Patent: Mar. 24, 2020

(54) SCANNING PROBE MICROSCOPE AND LIGHT INTENSITY ADJUSTING METHOD

(71) Applicant: Shimadzu Corporation, Kyoto (JP)

(72) Inventors: Kazuma Watanabe, Kyoto (JP); Keita Fujino, Kyoto (JP); Eiji Iida, Kyoto (JP); Masato Hirade, Kyoto (JP); Kenji Yamasaki, Kyoto (JP); Hideo Nakajima, Kyoto (JP); Yuichiro Ikeda, Kyoto (JP); Hiroshi Arai, Kyoto (JP)

(73) Assignee: Shimadzu Corporation, Nishinokyo-Kuwabaracho, Nakagyo-ku, Kyoto-shi, Kyoto (JP)

( * ) Notice: Subject to any disclaimer, the term of this patent is extended or adjusted under 35 U.S.C. 154(b) by 0 days.

(21) Appl. No.: 16/290,391

(22) Filed: Mar. 1, 2019

(65) Prior Publication Data
US 2019/0331711 A1 Oct. 31, 2019

(30) Foreign Application Priority Data
Apr. 25, 2018 (JP) .................................. 2018-083791

(51) Int. Cl.
*G01Q 20/02* (2010.01)
*G01Q 30/18* (2010.01)
*G01Q 30/04* (2010.01)
*G01Q 10/06* (2010.01)

(52) U.S. Cl.
CPC ........... *G01Q 20/02* (2013.01); *G01Q 10/065* (2013.01); *G01Q 30/04* (2013.01); *G01Q 30/18* (2013.01)

(58) Field of Classification Search
USPC ....................................................... 850/6, 33
See application file for complete search history.

(56) References Cited

U.S. PATENT DOCUMENTS

2010/0275334 A1* 10/2010 Proksch ................. G01Q 10/02
                                                                850/33
2014/0223612 A1    8/2014 Proksch et al.

FOREIGN PATENT DOCUMENTS

| JP | H05-192783 A | 8/1993 |
| JP | 2008-051556 A | 3/2008 |
| JP | 2009-103776 A | 5/2009 |

(Continued)

OTHER PUBLICATIONS

Notification of Reasons for Refusal from the Japanese Patent Office dated Aug. 27, 2019, for corresponding Japanese patent application No. JP 2018-083791, submitted with a machine translation.

*Primary Examiner* — Kiet T Nguyen
(74) *Attorney, Agent, or Firm* — Muir Patent Law, PLLC

(57) ABSTRACT

A scanning probe microscope includes a light source, a detector, a housing, an opening and closing door, an opening and closing sensor, a control unit, and the like. The opening and closing door is provided in the housing. The control unit 16 also functions as the light intensity change processing unit 164. In the scanning probe microscope, when the opening and closing sensor detects opening and closing of the opening and closing door, the light intensity change processing unit automatically changes the intensity of light irradiated from the light source based on a detection result of the opening and closing sensor. Therefore, it is possible to omit light intensity adjustment work performed manually by the user. As a result, the workability of the user when using the scanning probe microscope 1 can be improved.

4 Claims, 2 Drawing Sheets

(56) References Cited

FOREIGN PATENT DOCUMENTS

| JP | 2009-188128 A | 8/2009 |
|----|---------------|--------|
| JP | 2012-506049 A | 3/2012 |

* cited by examiner

SCANNING PROBE MICROSCOPE AND LIGHT INTENSITY ADJUSTING METHOD

CROSS REFERENCE TO RELATED APPLICATIONS

This application claims priority to Japanese patent Application No. 2018-083791 filed on Apr. 25, 2018, the entire disclosure of which is incorporated by reference herein.

BACKGROUND OF THE INVENTION

Field of the Invention

The present invention relates to a scanning probe microscope for acquiring a surface image of a sample by causing a cantilever to scan along a surface of the sample, and a light intensity adjusting method of the scanning probe microscope.

Description of the Related Art

Conventionally, a scanning probe microscope is used as an apparatus for inspecting a fine surface shape of a sample. In the scanning probe microscope, a probe is moved relative to a surface of a sample to perform scanning, and the probe is irradiated with laser light during the scanning. Based on reflected light from the probe, a change in a physical quantity (such as a tunnel current or an interatomic force) acting between the probe and the sample surface is detected. Then, a relative position of the probe is feedback-controlled so as to keep the physical quantity during the scanning constant. In this manner, a surface shape of the sample can be measured based on the feedback amount (see, for example, JP-A-2008-51556).

In the scanning probe microscope described in Patent Document 1, it is possible to adjust intensity of laser light with which a probe is irradiated. In this manner, for example, the intensity of the laser light can be adjusted according to a type of the probe, and measurement accuracy can be improved.

In the above-described conventional scanning probe microscope, intensity of laser light is adjusted manually. Therefore, there arises a problem that the operation by the user becomes complicated. In addition, troubles may occur in terms of safety. Specifically, in the scanning probe microscope, when a housing of the scanning probe microscope is opened in cases, such as that an optical axis of laser light is adjusted, intensity of the laser light needs to be lowered from the viewpoint of safety. In this case, the user manually adjusts the intensity of the laser light. However, if an operation error occurs, there is a possibility that the housing may be opened with the intensity of the laser light being high, which is dangerous. The present invention has been made in view of the above circumstances, and it is an object of the present invention to provide a scanning probe microscope capable of improving workability of the user.

SUMMARY OF THE INVENTION (1) A scanning probe microscope according to the present invention is a scanning probe microscope that acquires a surface image of a sample by scanning a cantilever along the surface of the sample. The scanning probe microscope includes a light source, a detector, a housing, an opening and closing door, an opening and closing sensor, and a light intensity change processing unit. The light source irradiates the cantilever with light. The detector receives reflected light from the cantilever. The housing houses the light source and the detector in the inside of the housing. The opening and closing door opens and closes the housing. The opening and closing sensor detects opening and closing of the opening and closing door. The light intensity change processing unit changes an intensity of light irradiated from the light source based on a detection result of the opening and closing sensor.

According to the above configuration, in the scanning probe microscope, when the opening and closing sensor detects opening and closing of the opening and closing door provided in the housing, the light intensity change processing unit automatically changes the intensity of light irradiated from the light source based on a detection result of the opening and closing sensor. Therefore, it is possible to omit light intensity adjustment work performed manually by the user. As a result, the workability of the user when using the scanning probe microscope can be improved.

(2) Further, when the opening and closing sensor detects that the opening and closing door is opened, the light intensity change processing unit may set an intensity of light irradiated from the light source to be lower than that when measurement of a sample is performed in a state where the opening and closing door is closed. According to such a configuration, when the opening and closing door is opened, the light intensity change processing unit automatically reduces the intensity of the light from the light source. Therefore, it is possible to prevent the opening and closing door from being opened while the intensity of the light from the light source is high.

As a result, safety in using the scanning probe microscope can be improved.

(3) A light intensity adjusting method according to the present invention is a light intensity adjusting method for a scanning probe microscope that causes a cantilever to scan along a surface of a sample, reflects light irradiated from a light source by the cantilever, and receives the reflected light by a detector to acquire a surface image of the sample. The light intensity adjusting method includes a light intensity changing step of changing an intensity of light irradiated from the light source when the opening and closing door for opening and closing a housing that houses the light source and the detector in the inside of the housing is opened and closed.

(4) Further, in the light intensity changing step, when the opening and closing door is opened, the intensity of the light irradiated from the light source may be set to be lower than that when measurement of the sample is performed with the opening and closing door closed.

According to the present invention, in the scanning probe microscope, when an opening and closing sensor detects opening and closing of an opening and closing door provided in a housing, the light intensity change processing unit automatically changes the intensity of light irradiated from a light source based on a detection result of the opening and closing sensor. Therefore, it is possible to omit light intensity adjustment work performed manually by the user. As a result, the workability of the user when using the scanning probe microscope can be improved.

DETAILED DESCRIPTION OF THE PREFERRED EMBODIMENTS

1. Overall Structure of Scanning Probe Microscope

Figure 1:
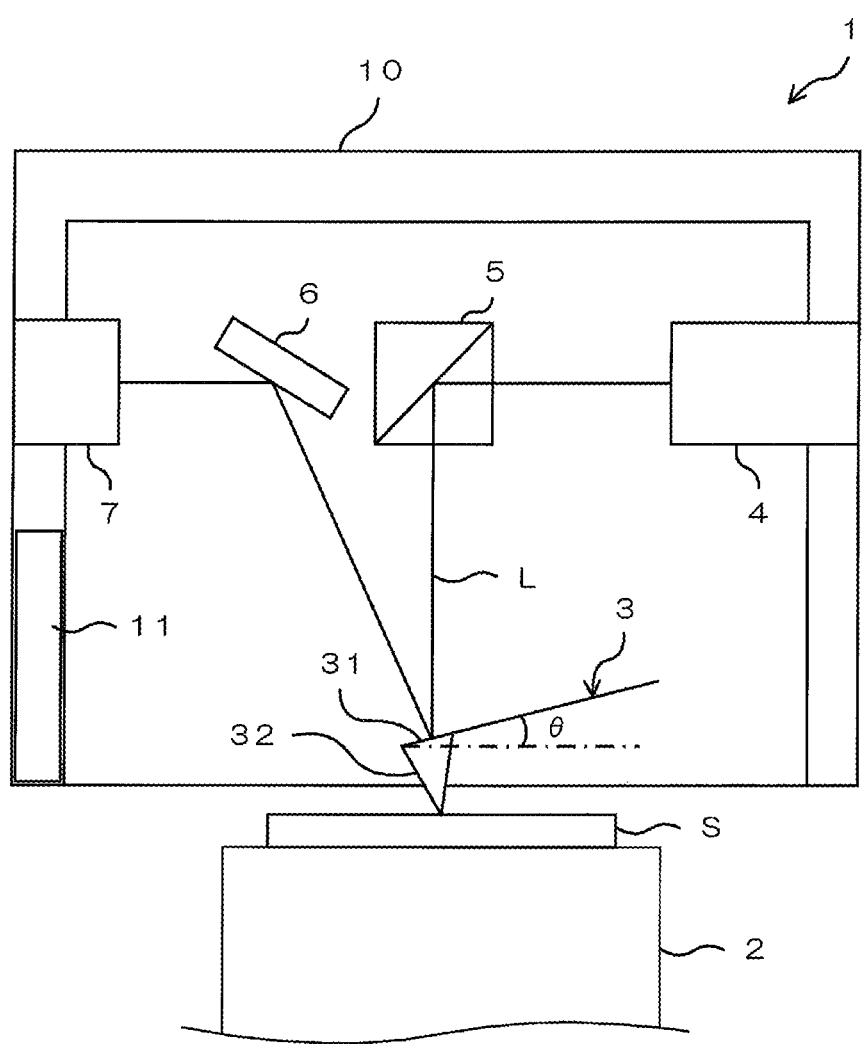
FIG. 1 is a schematic diagram showing a configuration example of a scanning probe microscope according to an embodiment of the present invention.

FIG. 1 is a schematic diagram showing a configuration example of a scanning probe microscope 1 according to an embodiment of the present invention. The scanning probe microscope 1 (SPM) includes, for example, a stage 2, a cantilever 3, a light source 4, a beam splitter 5, a mirror 6, a detector 7 and the like, and causes the cantilever 3 to scan a surface of the sample S so as to obtain an image (surface image) of an irregular surface of the sample S.

Further, the scanning probe microscope 1 is provided with a housing 10 and an opening and closing door 11. The housing 10 is formed in a box shape. The opening and closing door 11 is provided in the housing 10. The opening and closing door 11 is formed in a plate shape and is configured to be rotatable around one end. The opening and closing door 11 is a door for opening and closing the housing 10. Specifically, the opening and closing door 11 covers (closes) an opening formed on the housing 10 in a closed state and opens the opening formed on the housing 10 in an open state.

The cantilever 3, the light source 4, the beam splitter 5, the mirror 6, and the detector 7 are stored in the housing 10.

In the scanning probe microscope 1, the sample S is placed on the stage 2. In the scanning probe microscope 1, by displacing one of the stage 2 and the cantilever 3, the cantilever 3 is relatively moved along the surface of the sample S.

On the stage 2, for example, a piezoelectric element (not shown) is provided on an outer peripheral surface of the stage 2. When the stage 2 is displaced (deformed), a voltage is applied to the piezoelectric element. In this manner, the stage 2 is deformed as appropriate, and a position of the sample S on the stage 2 changes.

The cantilever 3 is provided at a position facing the sample S on the stage 2. The cantilever 3 is, for example, an extremely small elongated member having a length of about 150 μm and a width of about 30 to 40 μm, and is cantilevered. A reflecting surface 31 is formed in a tip on a free end side of the cantilever 3. On a surface of the cantilever 3 opposite to the reflecting surface 31, a probe 32 is provided. By moving the probe 32 along the surface of the sample S, it is possible to obtain an image of the irregular surface of the sample S.

The light source 4 is, for example, a laser light source such as a semiconductor laser.

The beam splitter 5 is disposed at a position where light from the light source 4 is incident. The light from the light source 4 is incident on the cantilever 3 via the beam splitter 5.

It should be noted that other optical members, such as a collimator lens and a focus lens (neither is shown), may be provided in an optical path from the light source 4 to the cantilever 3. In this case, after converting the irradiation light from the light source 4 into parallel light by the collimator lens, the parallel light can be condensed by the focus lens and guided to the cantilever 3 side.

In addition to the beam splitter 5, the collimator lens, the focus lens, and the like constitute an optical system for guiding the irradiation light from the light source 4 to the cantilever 3. However, the configuration of the optical system is not limited to this, and it may be configured such that at least one of the optical members as described above is not provided.

The mirror 6 guides the light reflected by the reflecting surface 31 of the cantilever 3 to the detector 7 by reflecting again.

The detector 7 has a configuration including a photodiode, such as a quadrant photodiode, or the like.

When observation of the sample S is performed in the scanning probe microscope 1, the probe 32 of the cantilever 3 is moved relative to the surface of the sample S in a state in which the sample S is set on the stage 2, and scanning is performed along the surface of the sample S. During this scanning, a physical quantity, such as an interatomic force, acting between the probe 32 of the cantilever 3 and the surface of the sample S changes.

Further, laser light is emitted from the light source 4. Light from the light source 4 travels through the beam splitter 5 toward the reflecting surface 31 of the cantilever 3. The light (reflected light) reflected by the reflecting surface 31 of the cantilever 3 is reflected again by the mirror 6 and received by the detector 7.

Here, the reflecting surface 31 of the cantilever 3 is inclined at a predetermined inclination angle θ with respect to a direction orthogonal to an optical axis L of the irradiation light from the light source 4. Therefore, when the probe 32 of the cantilever 3 is moved along the irregularity of the surface of the sample S, the cantilever 3 is deflected, and the inclination angle θ of the reflecting surface 31 changes. At this time, the position at which the reflected light from the reflecting surface 31 is received by the detector 7 changes. Therefore, it is possible to detect a change in a physical quantity acting between the probe 32 of the cantilever 3 and the surface of the sample S during the scanning, based on the change in the light receiving position of the reflected light on the detector 7. Then, a relative position of the probe 32 of the cantilever 3 is feedback-controlled so as to keep the physical quantity constant, and the surface shape of the sample S is measured based on the feedback amount (a surface image is acquired).

2. Electrical Configuration of the Control Unit and the Surrounding Members

Figure 2:
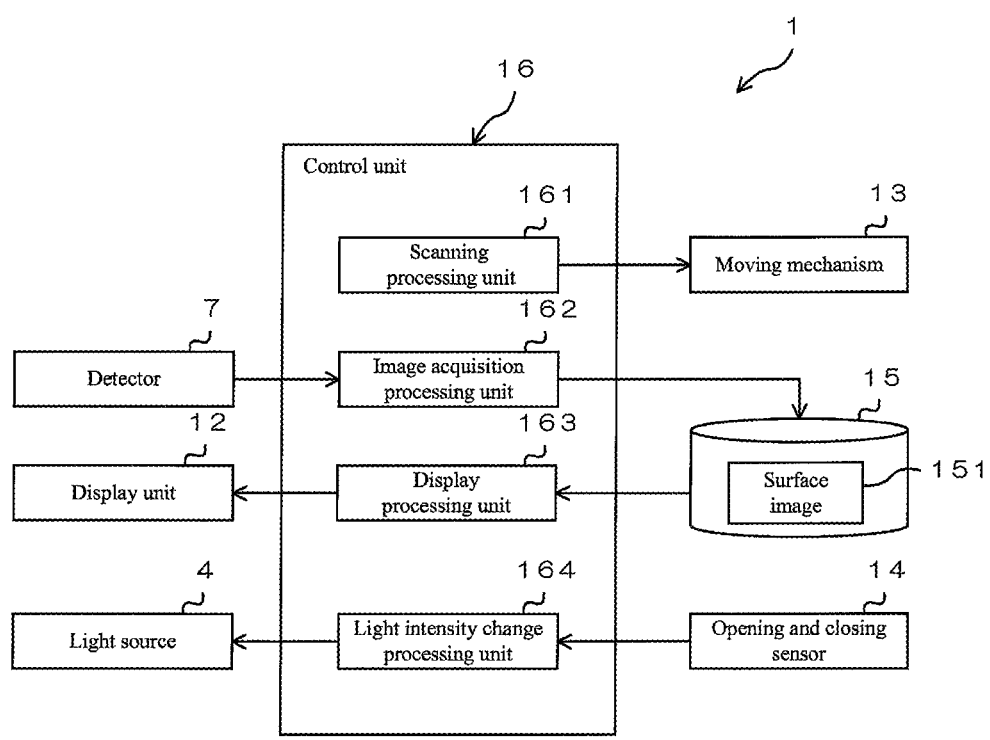
FIG. 2 is a block diagram showing an electrical configuration of a control unit and its surrounding members.

FIG. 2 is a block diagram showing an electrical configuration of the control unit 16 of the scanning probe microscope 1 and its surrounding members.

In addition to the light source 4 and the detector 7, the scanning probe microscope 1 includes a display unit 12, a moving mechanism 13, an opening and closing sensor 14, a storage unit 15, a control unit 16, and the like as an electrical configuration.

The display unit 12 is configured with, for example, a liquid crystal display.

The moving mechanism 13 is a mechanism for moving the stage 2 or the cantilever 3 (a mechanism for relatively moving the stage 2 and the cantilever 3). More specifically, the moving mechanism 13 moves the stage 2 in an X direction and a Y direction, or moves the cantilever 3 in the X direction and the Y direction.

The opening and closing sensor 14 is provided in the vicinity of the opening and closing door 11. The opening and closing sensor 14 is a sensor for detecting opening and closing of the opening and closing door 11. The opening and closing sensor 14 may be a contact type sensor or a non-contact type sensor.

The storage unit 15 is composed of a read only memory (ROM), a random access memory (RAM), a hard disk, and the like. A surface image 151 is stored in the storage unit 15. The surface image 151 is information on the surface image of the sample S.

The control unit 16 is configured to include, for example, a central processing unit (CPU). The light source 4, the detector 7, the display unit 12, the moving mechanism 13, the opening and closing sensor 14, the storage unit 15, and the like are electrically connected to the control unit 16. The control unit 16 functions as a scanning processing unit 161, an image acquisition processing unit 162, a display processing unit 163, a light intensity change processing unit 164, and the like by the CPU executing a program.

The scanning processing unit 161 relatively displaces the cantilever 3 with respect to the surface of the sample S by controlling operation of the moving mechanism 13. The image acquisition processing unit 162 acquires a surface image of the sample S based on a detection signal from the detector 7 caused to perform scanning by the scanning processing unit 161. Information of a surface image acquired by the image acquisition processing unit 162 is stored in the storage unit 15 as a surface image 151.

The display processing unit 163 reads out the surface image 151 of the storage unit 15 and performs processing of displaying the surface image 151 on the display unit 12.

The light intensity change processing unit 164 performs processing for changing the intensity of the light source 4 based on a detection signal from the opening and closing sensor 14.

3. Control Operation of the Control Unit

In the scanning probe microscope 1, when acquiring the surface image of the sample S, first, the moving mechanism 13 is operated under the control of the scanning processing unit 161. Then, the cantilever 3 is displaced relative to the surface of the sample S and the cantilever 3 is irradiated with laser light from the light source 4. Moreover, a feedback amount of a relative position of the cantilever 3 is detected by the detector 7. Further, the image acquisition processing unit 162 acquires the surface image of the sample S based on the detection signal from the detector 7, and the information of the surface image is stored in the storage unit 15 as the surface image 151. The display processing unit 163 reads out the surface image 151 and performs processing of displaying the readout surface image 151 on the display unit 12.

When the operation of acquiring such a surface image is performed, the opening and closing door 11 is closed. In this state, the opening and closing sensor 14 detects that the opening and closing door 11 is closed. The light intensity change processing unit 164 keeps the intensity of the light source 4 high in response to the opening and closing sensor 14 detecting that the opening and closing door 11 is closed. Since the surface image of the sample S is acquired in a state where the intensity of irradiation from the light source 4 is high as described above, an image with high accuracy can be acquired.

Meanwhile, optical axis adjustment may be performed before measurement or the like. In the optical axis adjustment, the arrangement of members of various optical systems (for example, the light source 4, the mirror 6, the detector 7, etc.) is adjusted so that the reflecting surface 31 of the cantilever 3 is accurately irradiated with laser light from the light source 4. In this case, work is performed with the opening and closing door 11 opened. When the opening and closing door 11 is opened, the opening and closing sensor 14 detects opening of the opening and closing door 11. When it is detected by the opening and closing sensor 14 that the opening and closing door 11 is closed, the light intensity change processing unit 164 reduces the intensity of the light source 4 (light intensity changing step). In this state, work of the optical axis adjustment is performed. When the user opens the opening and closing door 11 and performs work on the inside of the housing 10 as described above, the intensity of the light source 4 is automatically reduced by the control of the light intensity change processing unit 164. Therefore, the workability of the user when using the scanning probe microscope 1 is improved, and the safety is improved.

Specifically, in a state where the light source 4 is CW-driven, the light intensity change processing unit 164 performs processing of setting values of auto power control (APC) drive and auto current control (ACC) drive as light intensity change processing. Further, in a state where the light source 4 is pulse-driven, the light intensity change processing unit 164 performs processing of changing a duty ratio as light intensity change processing.

4. Function and Effect (1) According to the present embodiment, the scanning probe microscope 1 includes the light source 4, the detector 7, the housing 10, the opening and closing door 11, the opening and closing sensor 14, the control unit 16, and the like. The opening and closing door 11 is provided in the housing 10. The control unit 16 also functions as the light intensity change processing unit 164. In the scanning probe microscope 1, when the opening and closing sensor 14 detects opening and closing of the opening and closing door 11, the intensity of the light irradiated from the light source 4 is automatically changed by the light intensity change processing unit 164 based on the detection result of the opening and closing sensor 14 (light intensity changing step).

Therefore, it is possible to omit light intensity adjustment work performed manually by the user.

As a result, the workability of the user when using the scanning probe microscope 1 can be improved.

(2) According to the present embodiment, in the scanning probe microscope 1, when the opening and closing sensor 14 detects that the opening and closing door 11 is opened, the light intensity change processing unit 164 sets the intensity of the light irradiated from the light source 4 to be lower than that when the measurement of the sample S is performed in a state where the opening and closing door 11 is closed.

That is, in the scanning probe microscope 1, when the opening and closing door 11 is opened, the intensity of the laser light from the light source 4 is automatically reduced by the light intensity change processing unit 164.

Therefore, it is possible to prevent the opening and closing door 11 from being opened while the intensity of the laser light from the light source 4 remains high.

As a result, safety in using the scanning probe microscope 1 can be improved.

Further, since the intensity of the light source 4 is lowered when the opening and closing door 11 is opened, the life of the light source 4 can be prolonged. For example, the optical axis adjustment takes longer time than the measurement time. Accordingly, it is effective to reduce the intensity of the light source 4. Furthermore, when the light intensity change processing unit 164 performs the processing of changing the duty ratio of the light source 4, a time period during which the light source 4 is turned off increases, and the life of the light source 4 can be further prolonged.

What is claimed is:

1. A scanning probe microscope that acquires a surface image of a sample by causing a cantilever to scan along a surface of the sample, the scanning probe microscope comprising:
   a light source configured to irradiate the cantilever with light;
   a detector configured to receive reflected light from the cantilever;
   a housing configured to house the light source and the detector therein;
   an opening and closing door configured to open and close the housing;
   an opening and closing sensor configured to detect opening and closing of the opening and closing door; and
   a light intensity change processing unit configured to change an intensity of light irradiated from the light source based on a detection result of the opening and closing sensor.

2. The scanning probe microscope according to claim 1, wherein
   when the opening and closing sensor detects that the opening and closing door is opened, the light intensity change processing unit sets an intensity of light irradiated from the light source to be lower than that when measurement of a sample is performed in a state where the opening and closing door is closed.

3. A light intensity adjusting method for a scanning probe microscope that causes a cantilever to scan along a surface of a sample, reflects light irradiated from a light source with the cantilever, and receives the reflected light with a detector to acquire a surface image of the sample, the light intensity adjusting method comprising: a light intensity changing step for changing an intensity of light irradiated from the light source when an opening and closing door for opening and closing a housing that houses the light source and the detector therein is opened and closed.

4. The light intensity adjusting method according to claim 3, wherein
   when the opening and closing door is opened, the light intensity changing step sets an intensity of light irradiated from the light source to be lower than that when measurement of a sample is performed with the opening and closing door closed.

* * * * *